Jan. 21, 1964
E. F. RINKE
3,118,321
VEHICLE STEERING MECHANISM
Filed June 20, 1960
2 Sheets-Sheet 2
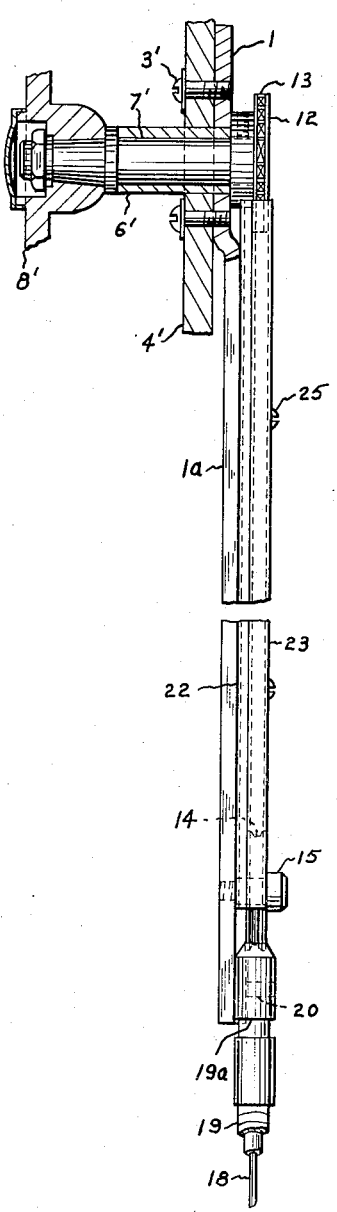
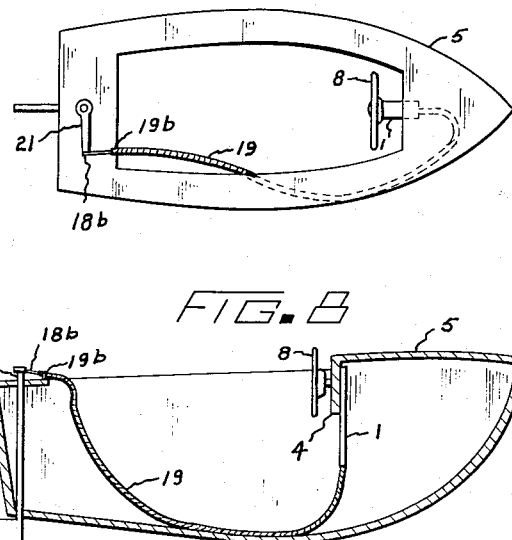
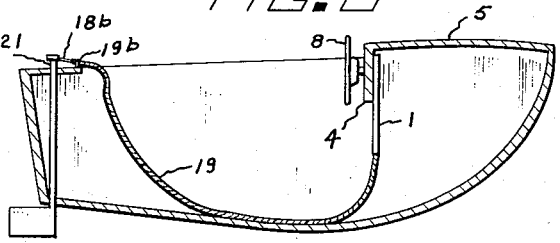
INVENTOR.
ELMER F. RINKE
BY
Allan J. Murray
ATTORNEY

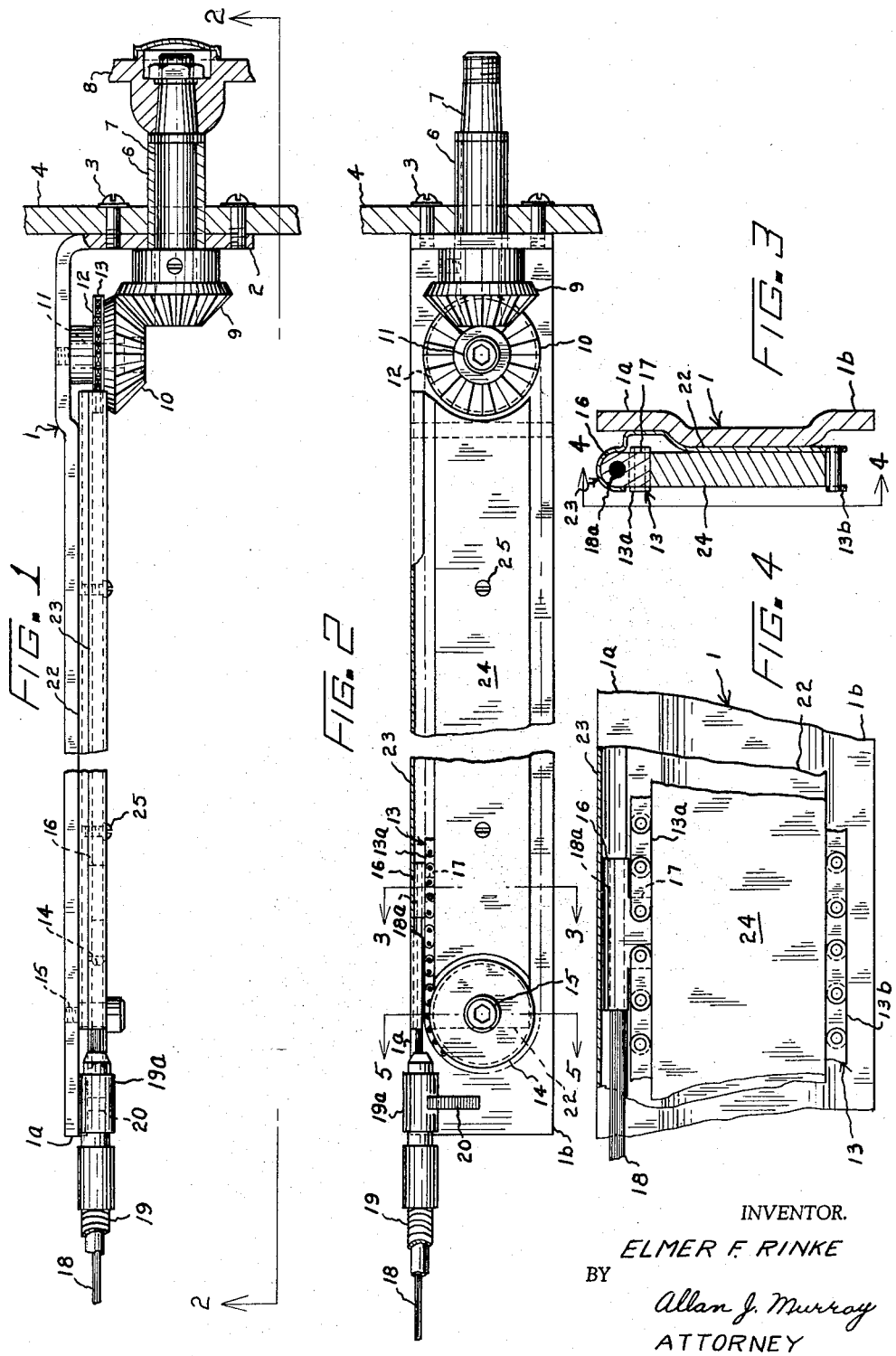

United States Patent Office 3,118,321
Patented Jan. 21, 1964

3,118,321
VEHICLE STEERING MECHANISM
Elmer F. Rinke, 44936 Sterritt, Utica, Mich.
Filed June 20, 1960, Ser. No. 37,137
5 Claims. (Cl. 74—496)

This invention relates to steering control mechanisms for vehicles, and particularly to such mechanisms as are applied to boats.

Most steering control mechanisms now available incorporate expensive pulley and cable arrangements, complex in nature and complicated to install.

An object of the invention is to provide an improved compact, simplified, and economically produced mechanism for steering control of vehicles.

A further object is to provide an actuator having substantially rectilinear reciprocable travel and having connection with the steering structure of a vehicle to operate said steering structure responsive to said reciprocable travel.

A further object is to provide said connection in the form of a flexible cable, slidable in the hollow core of a flexible sheath, and to provide a single means both restraining the actuator from movement laterally of its path of travel and restraining said cable from excessive flexing under a thrust applied thereto.

A further object is to provide an endless chain having said actuator attached to a span thereof, and to dispose said span in a position to cooperate with said means in so restraining said flexible cable.

Still another object is to provide means to maintain said span of the chain in said position.

These and various other objects are attained in the construction hereinafter described and illustrated in the accompanying drawings, wherein:

FIG. 1 is a top plan view in partial section.
FIG. 2 is a side elevation in partial section taken on line 2—2 of FIG. 1.
FIG. 3 is a sectional view on a larger scale taken on line 3—3 of FIG. 2.
FIG. 4 is a fragmentary view on a larger scale taken on line 4—4 of FIG. 3.
FIG. 5 is a sectional view on a larger scale taken on line 5—5 of FIG. 2.
FIG. 6 is a view in partial section of a modification of the invention.
FIGS. 7 and 8 illustrate respectively the installation of the invention and of the modification thereof in boats.

In these views, the reference character 1 designates an elongated bracket having an end portion 2 bent transversely to such bracket. Said end portion serves to mount the bracket, as by screws 3 or the like, upon a cross-member 4 of a boat 5. A bearing 6 is fixed on the end portion 2 and extends through the cross-member 4 to rotatably receive a shaft 7, having a steering wheel 8 mounted on an end thereof.

The opposite end of said shaft mounts a bevel gear 9, meshed with a second bevel gear 10 revolubly mounted on the bracket by means of a shoulder screw 11. A sprocket wheel 12 concentrically associates with said bevel gear 10 for rotation therewith.

The sprocket wheel supports and drives an endless chain 13, which receives further support from a pulley 14 spaced from the sprocket wheel longitudinally of the bracket, and revolubly mounted on the bracket by shoulder screw 15. An actuator 16 has a lug 17 which is disposed between and secured to a pair of chain links in a span 13a of the chain, whereby said actuator is carried in reciprocable travel as said chain is driven by the sprocket wheel 12. Such drive is applied to the chain by rotative actuation of the steering wheel 8, which, of course, rotates the shaft 7 to transmit driving force through said bevel gears 9 and 10 to the sprocket wheel 12.

An end portion of a flexible cable 18 is rigidly secured to the actuator 16, said cable being slidable in the hollow core of a flexible sheath 19. Such sheath has an end portion 19a rigidly secured to the bracket 1 by any conventional means such as welding, and may be additionally supported by a rib 20.

The opposite end of said sheath may be rigidly secured as at 19a to a convenient part of the boat, and the opposite end of said cable is attached as at 18b to the steering structure 21 of the boat. Acting through the cable 18, the actuator 16 operates the steering structure to guide the boat responsive to the reciprocable travel of said actuator.

In operation of the construction, it is desired to avoid any movement of the actuator laterally from its path of reciprocable travel, and to further restrain the flexible cable, as it is pushed through the sheath, from flexing to an extent that might render the construction inoperable by binding of the cable as it enters the hollow core of the sheath at the fixed end portion 19a. To accomplish these purposes, an elongated guide member 22 is marginally formed with an inverted guide channel 23 and is disposed so that said channel confines said cable, and substantially encloses the actuator. Said guide channel thus restrains the actuator from said lateral movement, and further restrains the cable from such flexing (upwardly as the device is disposed in FIG. 2).

The parallel relationship of the guide channel and the span of the chain carrying the actuator, enables such span of the chain to resist flexing of the cable downwardly (as seen in FIG. 2). Thus it is necessary to avoid any displacement of said span of the chain from said relationship due to flexing of the cable against such span. This may be accomplished by use of spacer bar 24 elongated between the sprocket wheel 12 and the pulley 14, so that the longitudinal lateral faces of such bar maintain the desired position of the spans of the chain. Screws 25 may be used to mount said spacer bar and guide member on the bracket. If it is desired to reduce friction of the chain sliding on the longitudinal lateral faces of the spacer bar, such bar may be replaced or supplanted with any appropriate number of rollers mounted on the bracket.

As is best seen in FIGS. 3 and 5, the longitudinal marginal portions 1a, 1b, of the elongated bracket are offset to space such portions from the chain to eliminate friction-creating contact of the chain with such marginal portions. Said offset is of such dimension as to further afford disposition of the end 19a of the sheath with the hollow core thereof disposed substantially in the plane occupied by the chain, sprocket wheel, and pulley, for most effective operation of the invention.

FIG. 6 illustrates a modification of the invention adapting same for use in a vertical position in a boat. In such modification, the transverse end portion 2 of the bracket 1 is eliminated, as are bevel gears 9 and 10. The sprocket wheel 12' is mounted directly on the shaft 7' to be driven directly by rotation of such shaft by steering wheel 8'.

Thus, the invention and the modification thereof afford use of the construction in a variety of positions in a boat, ranging from horizontal to vertical. Suitable housings for the invention may, of course, be provided to protect the mechanism from dirt, etc.

What I claim is:

1. A vehicle steering mechanism including an actuator movable in substantially rectilinear travel, means operatively interconnecting said actuator with a vehicle steering construction to actuate such steering construction responsive to said travel, a bracket elongated in the direction of said travel, an endless chain, rotatable elements mounted in spaced relation on said bracket to support said chain, said actuator being attached to a span of the chain, at least one of said elements being a sprocket wheel, and steering central means operatively engaged with and rotatively driving said sprocket wheel to drive the chain and afford said travel of said actuator, said bracket extending laterally beyond the spans of said chain, and having longitudinal marginal portions offset from the chain to avoid frictional contact with a side face of the chain.

2. A vehicle steering mechanism as set forth in claim 1, said first mentioned means including a flexible elongated sheath having a hollow core and a cable slidable in said core and interconnecting said actuator and such steering construction, an end portion of said sheath being rigidly secured to one of said longitudinal marginal portions, and the offset of said portion affording disposition of said rigidly secured end portion of the sheath with the core thereof substantially in the plane of said chain.

3. In a vehicle steering mechanism as set forth in claim 2, a guide member formed to partially enclose said actuator and resist lateral movement thereof from the path of said reciprocable travel, said guide member and said span of the chain restraining the cable from and material flexing within the confines of said guide member.

4. A vehicle steering mechanism as set forth in claim 3, wherein said guide member is mounted on said bracket to maintain a substantially parallel relation between said span and the elongated guide member, such relation affording said restraint of said cable.

5. A vehicle steering mechanism comprising an elongated bracket, a support for the bracket engaging one of its ends, a pair of rotatable supports respectively mounted on the respective end portions of the bracket, a drive chain mounted on the rotatable supports and having spaced substantially parallel spans, means carried by said bracket between said spans resisting their flexure toward each other, an actuator carried by one of said spans for reciprocation with such span, a cable having an end portion secured to said actuator for deriving a lengthwise drive from the actuator, means operatively engaged by the other end portion of the cable for applying a steering control to a vehicle, an elongated guide member for the chain clamped between the bracket and said first mentioned means and having a portion outwardly spaced from said span and confining said actuator to resist outward flexure of said span and of the cable, a tubular sheath wherein the cable is slidable, and means securing an end portion of the sheath on said bracket and maintaining alignment of the cable with said actuator, and steering control means operatively engaged with and rotatively driving one of said paired supports.

References Cited in the file of this patent
UNITED STATES PATENTS

| | | |
|---|---|---|
| 849,185 | Baldwin | Apr. 2, 1907 |
| 1,541,597 | Smith | June 9, 1925 |
| 1,905,539 | White | Apr. 25, 1933 |
| 2,330,802 | Andersen | Oct. 5, 1943 |
| 2,477,985 | Keim | Aug. 2, 1949 |
| 2,483,497 | Lewis | Oct. 4, 1949 |
| 2,757,553 | Marr | Aug. 7, 1956 |
| 2,890,595 | Lieffler | June 16, 1959 |
| 2,893,809 | Rahmel | July 7, 1959 |
| 2,987,937 | Sala | June 13, 1961 |